2,727,824
// Patented Dec. 20, 1955

2,727,824

ETHYL CELLULOSE CONTAINING BENZENE HEXACHLORIDE

William P. ter Horst, Lewiston, N. Y., assignor to Olin Mathieson Chemical Corporation, a corporation of Virginia No Drawing. Application February 7, 1952, Serial No. 270,514

6 Claims. (Cl. 106—15)

This invention relates to the production of ethyl cellulose plastics containing benzene hexachloride as extender and to the incorporation of low cost insecticidally inactive isomeric mixtures of benzene hexachloride in such plastics.

Ethyl cellulose plastics are outstanding for their combination of toughness and high dimensional stability. Their low specific gravity is an economic advantage. They have excellent moldability and resistance to a wide variety of inorganic chemicals including acids and alkalies. Their electrical properties are very satisfactory.

The uses of ethyl cellulose plastics are limited by their cost. The need for suitable extenders for these plastics is apparent. Any material which is miscible with them and which does not degrade their properties, thus in effect providing an increased supply, is in high demand. When the extender is also cheaply available, it is especially advantageous.

To be satisfactory, an extender for these plastics should not deleteriously affect any of its outstanding desirable properties. For this reason satisfactory extenders for these plastics are relatively few since the requirements are very severe. Extenders should not deleteriously affect softening point or decrease resistance to various chemicals. A desirable extender should also have inherently low volatility, adequate stability to light and heat and little or no odor. Suitable extenders should withstand molding temperatures used in the manufacture of shaped articles or temperatures at which the articles may later be used. The extenders should not form colored, odorous or corrosive decomposition products under these conditions.

I have discovered that benzene hexachloride,1,2,3,4,5,6-hexachlorocyclohexane is compatible with ethyl cellulose in proportions sufficient to extend it materially. The compatibility of benzene hexachloride with ethyl cellulose is about 15% but may, in some cases, be as high as about 20%. The compatibility appears to be somewhat lower with very high ethoxyl contents, for example 49–50%. The incorporation of the benzene hexachloride also imparts a flame retardant property to films and molded products, particularly in the higher concentration ranges. My invention therefore contemplates plasticized compositions of ethyl cellulose containing from about 1% up to the compatible limit of benzene hexachloride and with special advantage, from about 10 to about 15% by weight.

I have found that compositions in these proportions permit the use of benzene hexachloride as a valuable extender for reducing the cost of the plastic compositions without deleteriously affecting their desirable properties. Thus the range of potential commercial usefulness of the plastics is greately expanded. The extended compositions are stable under the usual conditions of manufacture and use and are apparently free from any noticeable evolution of hydrogen chloride or other decomposition products. The modified compositions are satisfactorily flexible, transparent and are otherwise suitable for the purposes for which they are commercially used.

In the manufacture of benzene hexachloride by the addition chlorination of benzene, several isomers are conventionally formed including usually about 10 to 15% of gamma isomer. This is the only isomer which has an important insecticidal activity. The gamma isomer is conventionally separated from the insecticidally inactive fractions in order to provide so-called gamma concentrates or pure gamma isomer (lindane). The latter products command much higher prices as insecticides than the crude mixtures. For this reason their use as extenders of plastics is not attractive commercially. In most commercial processes for the separation of the insecticidally active gamma isomer the relatively less soluble alpha and beta isomers are precipitated and removed, for example, by filtration. The resulting alpha, beta cake ordinarily predominates in the alpha isomer and is a particularly suitable material for use according to the present invention since large quantities are available at very low prices. Although I have found that the alpha isomer appears to be substantially more compatible with the plastic than the beta isomer, the alpha, beta cake conventionally obtained usually comprises about 90% of the alpha isomer with 10% of the beta isomer and in this form is substantially as compatible as pure alpha isomer.

In the application of my invention, I prefer to utilize fractions of benzene hexachloride which have been subjected to solvent treatment, for example, extraction or crystallization, since these operations remove the more odoriferous components of crude benzene hexachloride and yield a by-product fraction having little or no odor. However, I have noted that even the use of benzene hexachloride mixtures having a pronounced odor appears to result in virtually odor-free products.

Suitable grades of ethyl cellulose for use according to my invention are commercially available and may have, for example, ethoxyl contents of about 44–49%.

The benzene hexachloride may be incorporated by milling or other conventional means into the ethyl cellulose. The materials also may be dissolved in a mutual solvent and deposited therefrom in the form of a film or coating. In milling, temperatures of 350° F. to 400° F. may be used but at the higher temperatures shorter processing times are preferred. The preparation of typical benzene hexachloride modified ethyl cellulose compositions is illustrated in the following examples.

*Example I*

Films were prepared by mixing 90 parts by weight of 50-mesh ethyl cellulose containing 45% ethoxyl and known to the trade as 100 centipoise type, with 10 parts of finely divided alpha, beta-benzene hexachloride and pressing the mixture enclosed in cellophane sheets between press platens heated to about 350° F. The composition was held at a pressure of 3500 p. s. i. for 15 seconds. The resulting film was clear, tough and in every respect substantially the same as a film similarly prepared without the benzene hexachloride except for its flame retardant property.

*Example II*

A molding powder was prepared by mixing 85 parts of 50-mesh ethyl cellulose of 48% ethoxyl content and of the 100 centipoise type by pre-mixing with 15 parts of alpha, beta-benzene hexachloride and fluxing on hot rolls. The front roll temperature was 370° F. and the back roll temperature was 215° F. After forming the sheet, it was milled for 5 minutes to insure complete mixing. The clear sheet was stripped, cooled and ground.

*Example III*

Ninety parts of another sample of ethyl cellulose was dissolved with 10 parts of alpha, beta-benzene hexachloride in 400 parts of a mixture of 70% toluene and 30% ethanol by weight. The clear, viscous solution was cast onto a panel of plate glass. After drying in air and subsequently in a vacuum oven at 55–60° C. for several hours, the film was stripped. It was brilliant, tough, flexible and entirely clear.

I claim:

1. A composition of matter which consists essentially of ethyl cellulose and from about 1% to the compatible limit of benzene hexachloride.

2. The composition of claim 1 in which the benzene hexachloride comprises a substantially insecticidally inactive benzene hexachloride fraction.

3. The composition of claim 1 in which the benzene hexachloride comprises a substantially insecticidally inactive benzene hexachloride fraction predominating in the alpha isomer.

4. A composition of matter which consists essentially of ethyl cellulose and from about 10 to about 15% by weight of benzene hexachloride.

5. The composition of claim 4 in which the benzene hexachloride comprises a substantially insecticidally inactive benzene hexachloride fraction.

6. The composition of claim 4 in which the benzene hexachloride comprises a substantially insecticidally inactive benzene hexachloride fraction predominating in the alpha isomer.

No references cited.